(12) United States Patent
Zhong et al.

(10) Patent No.: US 9,332,039 B2
(45) Date of Patent: May 3, 2016

(54) METHOD, APPARATUS, AND SYSTEM FOR ESTABLISHING VOICE COMMUNICATION

(71) Applicant: TENCENT TECHNOLOGY (SHENZHEN) COMPANY LIMITED, Shezhen (CN)

(72) Inventors: Daowei Zhong, Shenzhen (CN); Jian Gu, Shenzhen (CN); Weiwei Dai, Shenzhen (CN); Huihui Deng, Shenzhen (CN); Tongfeng Zhao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 83 days.

(21) Appl. No.: 14/262,797

(22) Filed: Apr. 27, 2014

(65) Prior Publication Data

US 2014/0233559 A1     Aug. 21, 2014

Related U.S. Application Data

(63) Continuation of application No. PCT/CN2013/089069, filed on Dec. 11, 2013.

(30) Foreign Application Priority Data

Dec. 26, 2012   (CN) .................. 2012 1 05748486

(51) Int. Cl.
*H04L 29/06*     (2006.01)
*H04M 3/493*    (2006.01)
(Continued)

(52) U.S. Cl.
CPC .......... *H04L 65/1069* (2013.01); *H04L 51/046* (2013.01); *H04L 65/403* (2013.01); *H04L 67/38* (2013.01); *H04M 3/4931* (2013.01); *H04M 3/44* (2013.01)

(58) Field of Classification Search
CPC ..... H04L 51/046; H04L 65/403; H04L 67/38; H04M 3/44; H04M 3/4931
See application file for complete search history.

(56) References Cited

U.S. PATENT DOCUMENTS

2009/0006632 A1   1/2009  Ramanathan et al.
2012/0110099 A1*  5/2012  Fujihara .............. H04L 12/1818
                                                 709/206

FOREIGN PATENT DOCUMENTS

CN       1976322 A      6/2007
CN       201571155 U    9/2010
(Continued)

OTHER PUBLICATIONS

The World Intellectual Property Organization (WIPO) International Search Report for PCT/CN2013/089069 Mar. 13, 2014.
(Continued)

*Primary Examiner* — Pao Sinkantarakorn
(74) *Attorney, Agent, or Firm* — Anova Law Group, PLLC

(57) ABSTRACT

Methods, apparatus and systems for establishing voice communication are provided herein. An exemplary method can be implemented by an electronic device. A request initiated by a user can be received. The request can include one of a voice-communication request, a voice-communication-invitation request, a temporary-voice-communication request, a temporary-voice-communication-invitation request, an exclusive-voice-communication request, and an exclusive-voice-communication-invitation request. According to the request, a voice-room number can be obtained from a first server or a second server, without using third-party communication software. The method further includes starting a voice client and entering a voice room directly using the voice client, according to the voice-room number.

20 Claims, 11 Drawing Sheets

(51) Int. Cl.
*H04L 12/58* (2006.01)
*H04M 3/44* (2006.01)

(56) References Cited

FOREIGN PATENT DOCUMENTS

| CN | 102185856 A | 9/2011 |
| CN | 103023913 A | 4/2013 |

OTHER PUBLICATIONS

The State Intellectual Property Office of the People's Republic of China (SIPO) Office Action 1 for 2012-105748486 Dec. 1, 2014.
The State Intellectual Property Office of the People's Republic of China (SIPO) Office Action 2 for 2012-105748486 Aug. 5, 2015.

* cited by examiner

600

METHOD, APPARATUS, AND SYSTEM FOR ESTABLISHING VOICE COMMUNICATION

CROSS-REFERENCES TO RELATED APPLICATIONS

This application is a continuation application of PCT Patent Application No. PCT/CN2013/089069, filed on Dec. 11, 2013, which claims priority to Chinese Patent Application No. 201210574848.6, filed on Dec. 26, 2012, the entire contents of which are incorporated herein by reference.

FIELD OF THE DISCLOSURE

The present disclosure generally relates to communication technology and, more particularly, relates to methods, apparatus, and systems for establishing voice communication.

BACKGROUND

With the development of Internet technology in recent years, network games have grown more and more popular, and have gradually become a part of leisure and entertainment in people's daily life.

For better communication between game players, conventional network games usually provide a voice communication function. In a conventional network game, the voice communication function is usually provided by a third-party product. For example, a player needs to inform other players of a relevant voice-room number (or chat-room number) by in-game chat or other methods such as an e-mail. Next, after entering a same voice room using the voice-room number, the players may perform the voice communication.

Therefore, voice communication methods in existing games are complicated to operate, take too much time to establish voice communication, and are inconvenient to manage.

BRIEF SUMMARY OF THE DISCLOSURE

According to various embodiments, there is provided a method for establishing voice communication. An exemplary method can be implemented by an electronic device. In the exemplary method, a request initiated by a user can be received. The request can include one of a voice-communication request, a voice-communication-invitation request, a temporary-voice-communication request, a temporary-voice-communication-invitation request, an exclusive-voice-communication request, and an exclusive-voice-communication-invitation request. According to the request, a voice-room number can be obtained from a first server or a second server, without using third-party communication software. The method further includes starting a voice client and entering a voice room directly using the voice client, according to the voice-room number.

According to various embodiments, there is also provided an apparatus for establishing voice communication. The apparatus can include an obtaining unit and a starting unit. The obtaining unit can be configured to receive a request initiated by a user. The request can includes one of a voice-communication request, a voice-communication-invitation request, a temporary-voice-communication request, a temporary-voice-communication-invitation request, an exclusive-voice-communication request; and an exclusive-voice-communication-invitation request. The obtaining unit can be further configured to obtain a voice-room number from a first server or a second server according to the request, without using third-party communication software. The starting unit can be configured to start a voice client and enter a voice room directly using the voice client, according to the voice-room number.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Figure 6:
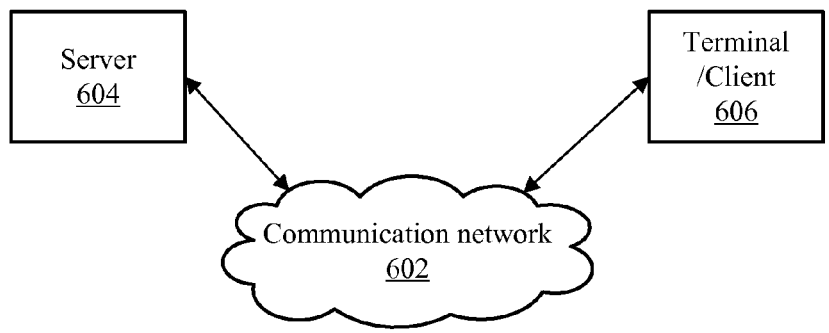
FIG. 6 depicts an exemplary environment incorporating certain disclosed embodiments.

FIG. 6 depicts an exemplary environment 600 incorporating exemplary methods, apparatus and systems for establishing voice communication in accordance with various disclosed embodiments. As shown in FIG. 6, the environment 600 can include a server 604, a terminal 606, and a communication network 602. The server 604 and the terminal 606 may be coupled through the communication network 602 for information exchange. In one example, the server 604 may generate certain identifiers of groups in network games and broadcast the identifiers to users (e.g., the terminals 606) of the corresponding groups through the communication network 602. In another example, the terminal 606 may send a certain identifier to the server 604 to obtain a voice-room number from the server 604 for voice communication. In yet another example, the terminal 606 may send a voice-communication-invitation request to other terminals 606 through the server 604.

Although only one terminal 606 and one server 604 are shown in the environment 600, any number of terminals 606 or servers 604 may be included, and other devices may also be included. For example, the servers 604 can include a game server, a voice server, etc. The terminals 606 can include one or more terminals that may belong to certain groups in an application, e.g. a network game or other suitable applications.

In addition, each of the terminals 606 can include one or more clients therein to perform various functions. For example, the terminals 606 can include one or more application clients, e.g., a game client, a voice client, etc. The application client can be a terminal that is used to implement certain type of applications. In one embodiment, the voice client and the game client can be physically separated, while coupled with the communication network 602. In another embodiment, the voice client and the game client can be combined physically to be used in one terminal. For example, the voice client can be embedded in the game client. To implement the functions in accordance with various disclosed embodiments, the voice client and the game client can be combined, coupled or connected in various ways, which are not limited by the present disclosure.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device.

A server, as used herein, may refer to one or more server computers configured to provide certain server functionalities, e.g., managing communication of certain groups in applications (e.g., network games), database management, allocating voice-room numbers for voice communication, etc. A server may also include one or more processors to execute computer programs in parallel.

Figure 7:
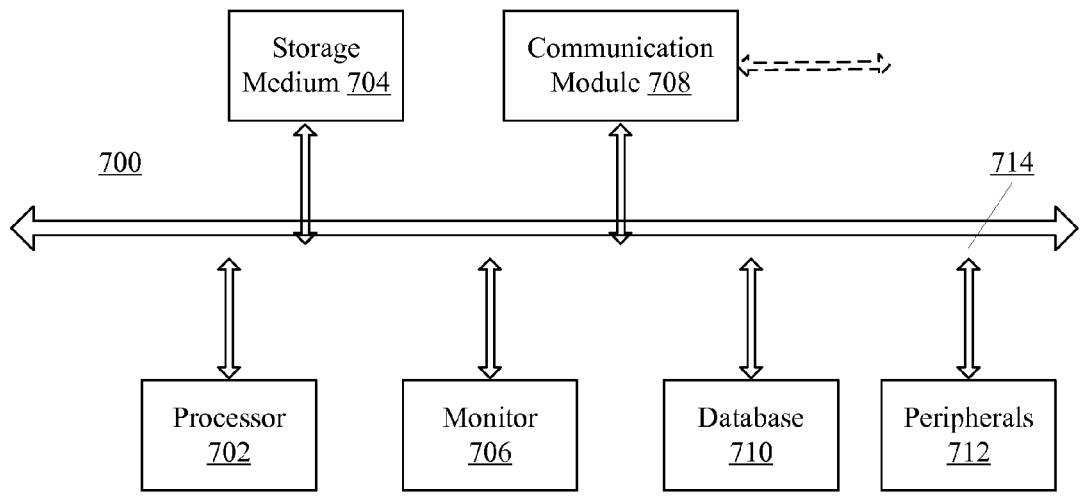
FIG. 7 depicts an exemplary computing system consistent with the disclosed embodiments.

The server 604 and the terminal 606 may be implemented on any appropriate computing platform. FIG. 7 shows a block diagram of an exemplary computing system 700 capable of implementing the server 604 and/or the terminal 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., voice communication, network games, etc.), when executed by the processor 702.

The monitor 706 may include display devices for displaying contents and information generated by the computing system 700, e.g., displaying information related to voice communication, displaying buttons for user to trigger certain functions, and/or other suitable operations. The peripherals 712 may include I/O devices such as keyboard, mouse, microphone, speaker, etc. for inputting information, triggering certain buttons shown on the monitor 706, performing voice communication, and any other suitable functions.

Further, the communication module 708 may include network devices for establishing connections through the communication network 602. The database 710 may include one or more databases for storing certain data and for performing certain operations on the stored data, e.g., managing voice-room data, manage information of users and groups in certain applications, database searching (e.g., game database searching), etc.

In operation, the terminal 606 may cause the server 604 to perform certain actions, e.g., game database search, sending voice-communication-invitation requests to other terminals 606, obtaining and sending voice-room numbers, generating identifiers, etc. The server 604 may be configured to provide structures and functions for such actions and operations.

In various embodiments, a terminal involved in the disclosed methods and systems can include the terminal 606, while a server involved in the disclosed methods and systems can include the server 604. In various embodiments, the disclosed methods and apparatus can be implemented by a terminal (e.g., an electronic device). For example, the terminal (e.g., the electronic device) can include a game client and/or a voice client.

Various embodiments provide methods, apparatus and systems for establishing voice communication. An exemplary apparatus for establishing voice communication can be implemented by an application client, e.g., a game client. In one embodiment, the apparatus for establishing voice communication can be installed in a terminal, for example, installed in a personal computer, a mobile phone or a tablet computer, etc.

Figure 1:
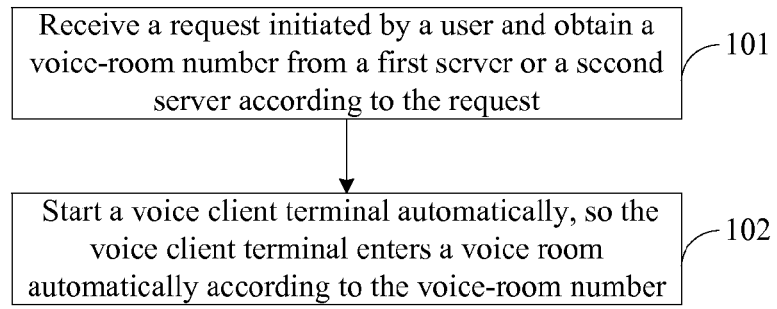
FIG. 1 depicts a flow diagram of an exemplary method for establishing voice communication in accordance with various disclosed embodiments.

FIG. 1 depicts a flow diagram of an exemplary method for establishing voice communication in accordance with various disclosed embodiments.

In Step 101, a voice-room number is obtained. The voice-room number can be obtained by a variety of methods, e.g., in a binding-voice-room mode, in a temporary-voice-room mode, in an exclusive-voice-room mode, and/or other suitable mode, according to different application scenarios.

In one example, the voice-room number can be obtained in a binding-voice-room mode. The binding-voice-room mode may apply to fixed small groups organized by certain users, e.g., the fixed small groups organized by certain players in games including families, special groups (e.g., clans, gangs, tribes), etc.

In the binding-voice-room mode, the voice-room number can be obtained by the following steps. For example, a voice-communication request initiated by a user can be received. According to the voice-communication request, a group (or an organization, or a group organization) that the user belongs to can be determined. A first server can then be notified of the group that the user belongs to. A voice-room number returned by the first server can thus be received.

In one embodiment, the voice-room number can be obtained by the first server by inquiring about binding information corresponding to the group that the user belongs to. For example, the user can apply for the voice-room number from a voice service provider, and then bind the voice-room number (obtained by application) with the group (e.g. a group organization in a game) though the application client. Such information of binding can be used as binding information. The binding information can be stored on the first server. Thus, when the application client needs to obtain the voice-room number, the first server can obtain the voice-room number by inquiring about the binding information corresponding to the group that the user belongs to. The first server can thus provide the voice-room number for the terminal.

That is, before obtaining the voice-room number, the method for establishing voice communication can further include the following steps. For example, the voice-room number that the user applies for can be received. Next, the voice-room number (obtained by application) can be bound with the group (e.g. the group organization in the game) to get the binding information. The binding information can then be stored on the first server.

In addition, a user can invite other users to join the voice communication. In a voice invitation process, the voice-room number can be obtained by the following steps. For example, a voice-communication-invitation request initiated by a user can be received. According to the voice-communication-invitation request, a group that the user belongs to can be determined. A first server can then be notified of the group that the user belongs to. A voice-room number returned by the first server can thus be received, and can be sent by the first server to users (i.e., other users) in the group that the user belongs to.

Optionally, in order to improve flexibility of the voice communication, an invited-user list can be carried in the voice-communication-invitation request. When the invited-user list is carried in the voice-communication-invitation request, the first server can send the voice-room number to invited users according to the invited-user list. That is, the voice-room number can be obtained by the following steps. For example, the voice-communication-invitation request initiated by the user is received. The invited-user list can be carried in the voice-communication-invitation request. According to the voice-communication-invitation request, the group that the user belongs to can be determined. The first server can then be notified of the group that the user belongs to. The voice-room number returned by the first server can thus be received, and can be sent by the first server to the invited users according to the invited-user list.

The voice-room number can be obtained by the first server by inquiring about the binding information corresponding to the group that the user belongs to, which can be executed in similar or the same steps as depicted above in accordance with various disclosed embodiments.

In another example, the voice-room number can be obtained in a temporary-voice-room mode.

Temporary voice rooms can refer to voice rooms provided for certain temporary or random groups, e.g., temporary teams in a game, and/or other suitable groups. In the temporary-voice-room mode, a voice communication function may need to be provided for a temporary group without a need to apply for a binding-voice-room number beforehand.

In the temporary-voice-room mode, the voice-room number can be obtained by the following steps. For example, a temporary-voice-communication request (or a temporary request) initiated by a user can be received. According to the temporary request, a temporary-team identifier can be obtained. The temporary-team identifier can be sent to a second server. A voice-room number returned by the second server can thus be received.

In addition, a user can invite other users to join the voice communication. In a voice invitation process, the voice-room number can be obtained by the following steps. For example, a temporary-voice-communication-invitation request (or a temporary-invitation request) initiated by a user is received. The temporary-invitation request can be sent by a first server to users in a temporary group. According to the temporary-invitation request, a temporary-team identifier can be obtained. The temporary-team identifier can then be sent to a second server. A voice-room number returned by the second server can thus be received.

Optionally, in order to improve flexibility of the voice communication, an invited-user list can be carried in the temporary-invitation request. When the invited-user list is carried in the temporary-invitation request, the first server can send the temporary-invitation request to the invited users according to the invited-user list. That is, the voice-room number can be obtained by a method including the following steps.

For example, the temporary-invitation request initiated by the user is received. The invited-user list can be carried in the temporary-invitation request. On one hand, the temporary-invitation request can be sent to the first server, and can be sent by the first server to the invited users according to the invited-user list. On the other hand, the temporary-team identifier can be obtained according to the temporary-invitation request and be sent to the second server. The voice-room number returned by the second server can thus be received.

In one embodiment, after receiving the temporary-invitation request sent by the first server, the other users (or the invited users) of the temporary group can obtain the temporary-team identifier according to the temporary-invitation request. The invited users can then send the temporary-team identifier to the second server and receive the voice-room number returned by the second server.

The voice-room number can be obtained by the second server by allocating a free voice-room number (or a free voice room) according to the temporary-team identifier of the temporary group.

For example, when the first server creates temporary groups, one temporary-team identifier can be generated for each temporary group in order to identify each of subsequent voice rooms, i.e., to map to each of the voice rooms. After creating the temporary group, the first server can inform all users (of the temporary group) of the temporary-team identifier. Thus, when obtaining the voice-room number is needed, the user or the users can simply send the temporary-team identifier. The second server can dynamically allocate a free voice-room number according to the temporary-team identifier and provide the allocated voice-room number for the users of the clients.

Therefore, before obtaining the voice-room number, the method for establishing voice communication can further include receiving the temporary-team identifier sent by the first server. The temporary-team identifier can be generated by the first server when creating the temporary group.

In another example, the voice-room number can be obtained in an exclusive-voice-room mode.

Exclusive voice rooms can refer to fixed exclusive voice rooms provided for certain fixed groups (or group organizations), e.g., exclusive game rooms. For example, there can be certain fixed organization forms (or organizations) in some large-scale network games, e.g., nations, alliances, etc., for which fixed exclusive voice rooms may generally need to be provided.

In the exclusive-voice-room mode, the voice-room number can be obtained by a method including the following steps. For example, an exclusive-room-voice-communication request (or an exclusive request) initiated by a user can be received. According to the exclusive request, a global identifier can be obtained. The global identifier can be sent to a second server. A voice-room number returned by the second server can thus be received.

In addition, a user can invite other users to join the voice communication. In a voice invitation process, the voice-room number can be obtained by the following steps. For example, an exclusive-room-voice-communication-invitation request (or an exclusive-invitation request) initiated by a user can be received. The exclusive-invitation request can be sent by a first server to users in a fixed group. The global identifier can be obtained according to the exclusive-invitation request and be sent to the second server. A voice-room number returned by the second server can thus be received.

Optionally, in order to improve flexibility of the voice communication, an invited-user list can be carried in the exclusive-invitation request. When the invited-user list is carried in exclusive-invitation request, the first server can send the exclusive-invitation request to the invited users according to the invited-user list. That is, the voice-room number can be obtained by the following steps.

For example, the exclusive-invitation request initiated by the user can be received. The invited-user list can be carried in the exclusive-invitation request. On one hand, the exclusive-invitation request can be sent to the first server and be sent by the first server to the invited users according to the invited-user list. On the other hand, the global identifier can be obtained according to the exclusive-invitation request, and can be sent to the second server. The voice-room number returned by the second server can thus be received.

After receiving the exclusive-invitation request sent by the first server, the other users (or the invited users) of the fixed group can obtain the global identifier according to the exclusive-invitation request. The invited users can then send the global identifier to the second server and receive the voice-room number returned by the second server.

The voice-room number can be obtained by the second server by selecting from reserved free voice rooms (or reserved free voice-room numbers) according to the global identifier of the fixed group.

For example, the first server (e.g., a game server) can generate one global identifier for each fixed group according to a specific algorithm, and map each global identifier to a reserved free voice room (correspondingly). When the user logs in to the first server, the first server can inform the user of the global identifier of the fixed group that the user belongs to, so that the corresponding voice-room number can be obtained subsequently according to the global identifier.

Therefore, before obtaining the voice-room number, the method for establishing voice communication can further include receiving the global identifier that is sent (or broadcasted) by the first server when the user logs in to the first server. The global identifier can be generated by the first server when creating the fixed group.

In one embodiment, after the user logs in to the first server, in addition to obtaining the voice-room number, the user can also apply for management-authorization information from the first server, e.g., apply for management authorization signatures or any other management-authorization information. The management-authorization information can be generated using certain common symmetric encryption algorithm(s), and can store management authorization of voice room(s), e.g., whether to allow speaking, whether to allow kicking (a type of command or action, e.g., in games), or whether to allow setting other user's (or other people's) authorization to speak. Authorization can be set based on the needs of practical applications. For example, voice authorization (or voice-room authorization) can be set correspondingly according to certain information, e.g., the user's job position in the fixed group. When the user enters a voice room, the management-authorization information can be decrypted by the second server, e.g., a voice server, according to the symmetric algorithm and a shared key. Accordingly, the voice-room authorization of the user can be obtained and set.

That is, after receiving the voice-room number broadcasted by the server (e.g., the second server), the method for establishing voice communication can further include applying for the management-authorization information from the first server, such that the second server can set the voice-room authorization of the user according to the management-authorization information that the user applies for. The first server can be an application server, e.g., the game server. The second server can be the voice server or other server that can provide voice service.

The application for the management-authorization information and the obtaining and setting of the voice-room authorization can be performed in various modes, e.g., the binding-voice-room mode, the temporary-voice-room mode, the exclusive-voice-room mode, or any other modes, without limitation.

In Step 102, a voice client is started. The voice client can thus enter the voice room according to the voice-room number.

The voice client can be embedded in an apparatus for establishing voice communication, e.g., in the game client.

According to various disclosed embodiments, the voice-room number can be automatically (and directly) obtained and the voice client can then be automatically (and directly) started. Thus, according to the voice-room number, the voice client can enter the voice room for the voice communication automatically and directly. There is no need for the user(s) to mutually transmit the voice-room number by themselves through third-party software, and then establish the voice communication according to the voice-room number. Therefore, time used for establishing the voice communication can be saved. In addition, since no third-party software needs to be involved, the operation can be relatively simple and can be easily managed.

The method disclosed above in accordance with various embodiments can be illustrated in further detail in the following examples.

In one embodiment, an apparatus for establishing voice communication can be a game client, for example. A first server can be a game server. A second server can be a voice server. In this example, a method for establishing voice communication can be implemented in a binding-voice-room mode.

Figure 2A:
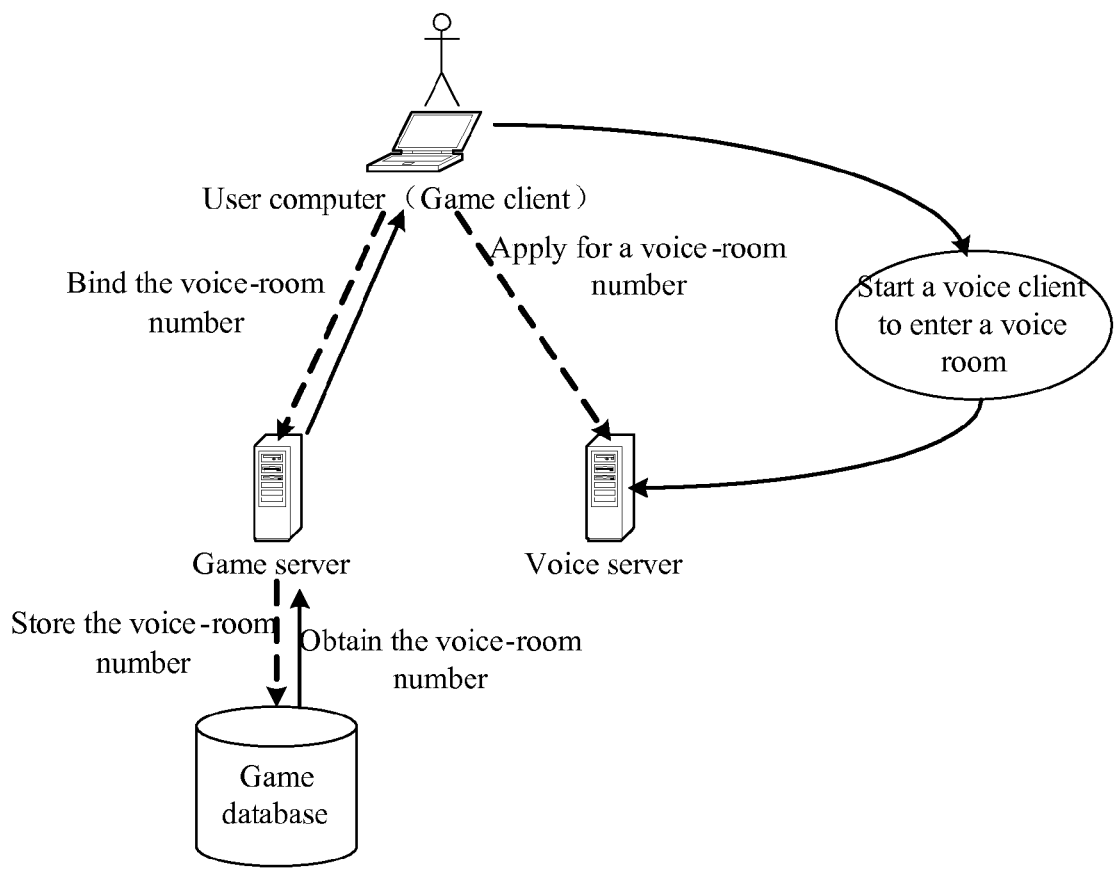
FIG. 2a depicts a scenario illustrating a binding-voice-room mode in accordance with various disclosed embodiments.
Figure 2B:
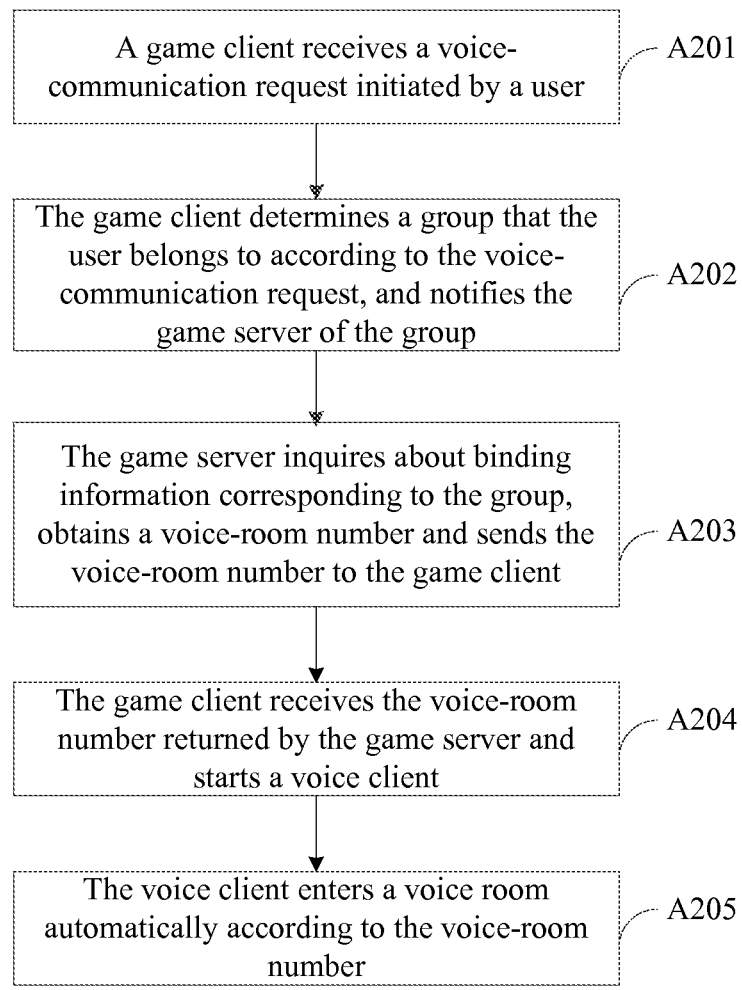
FIG. 2b depicts a flow diagram of an exemplary method for establishing voice communication (in a binding-voice-room mode) in accordance with various disclosed embodiments.

FIG. 2a depicts a scenario illustrating a binding-voice-room mode in accordance with various disclosed embodiments. FIG. 2b depicts a flow diagram of an exemplary method for establishing voice communication (in a binding-voice-room mode) in accordance with various disclosed embodiments. As shown in FIGS. 2a-2b, an exemplary method for establishing voice communication can include the following exemplary steps.

In Step A201, a game client receives a voice-communication request initiated by a user.

For example, a voice-communication-trigger button can be set up in the game client. Thus, when the user triggers the voice-communication-trigger button, e.g., by clicking the voice-communication-trigger button, the game client can receive the voice-communication request initiated by the user.

The game client can be installed in a terminal, e.g., a personal computer, a mobile phone, a tablet computer, or other suitable devices. In the example shown in FIG. 2a, the game client is installed in a user computer.

In Step A202, the game client determines a group that the user belongs to according to the voice-communication request, and notifies the game server of the group that the user belongs to.

For example, in some games, game players may organize some fixed small groups, e.g., families, special groups (e.g., clans, gangs, tribes), etc. Thus, the game client can determine a family or special group that the user belongs to according to the voice-communication request, and notify the game server of the family or special group that the user belongs to.

In Step A203, the game server inquires about binding information corresponding to the group that the user belongs to, obtains a voice-room number and sends the voice-room number to the game client.

The binding information can be stored in a game database of the game server. For example, the user can apply for the voice-room number from a voice service provider, and then bind the voice-room number (obtained by application) with the group (e.g. a group in a game) though the game client. The binding information can be stored on the first server.

For example, when the voice-room number is bound with the group (e.g. the family, or special group, etc.), by knowing the family or the special group that the user belongs to, the corresponding voice-room number can be known according to the binding information.

For example, as shown in FIG. 2a, dashed lines depict a process of applying for and binding the voice-room number.

In Step A204, the game client receives the voice-room number returned by the game server and starts a voice client. The voice client can be embedded in the game client.

In Step A205, the voice client enters a voice room automatically according to the voice-room number.

For example, Steps A204-A205 can be implemented using the process shown in FIG. 2a.

Figure 2C:
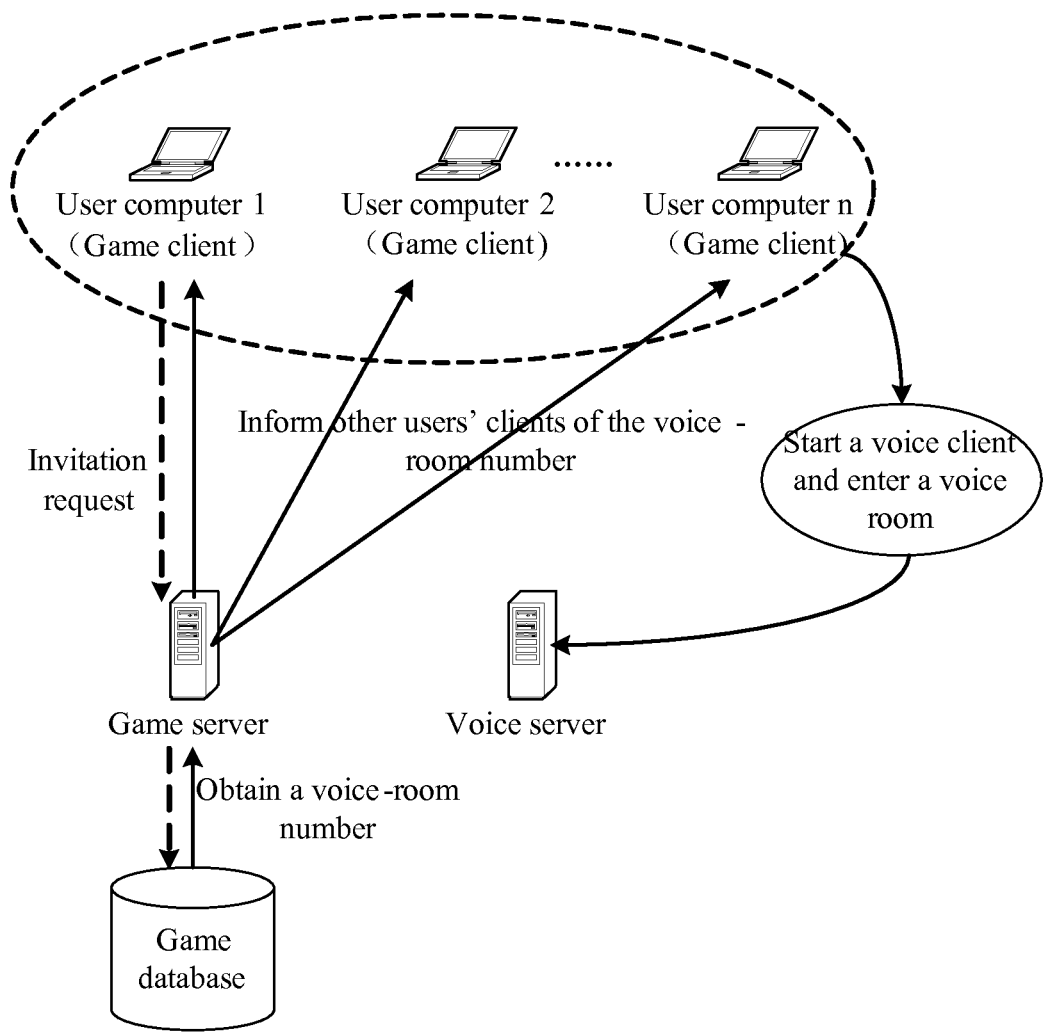
FIG. 2c depicts a scenario illustrating an invitation process in a binding-voice-room mode in accordance with various disclosed embodiments.
Figure 2D:
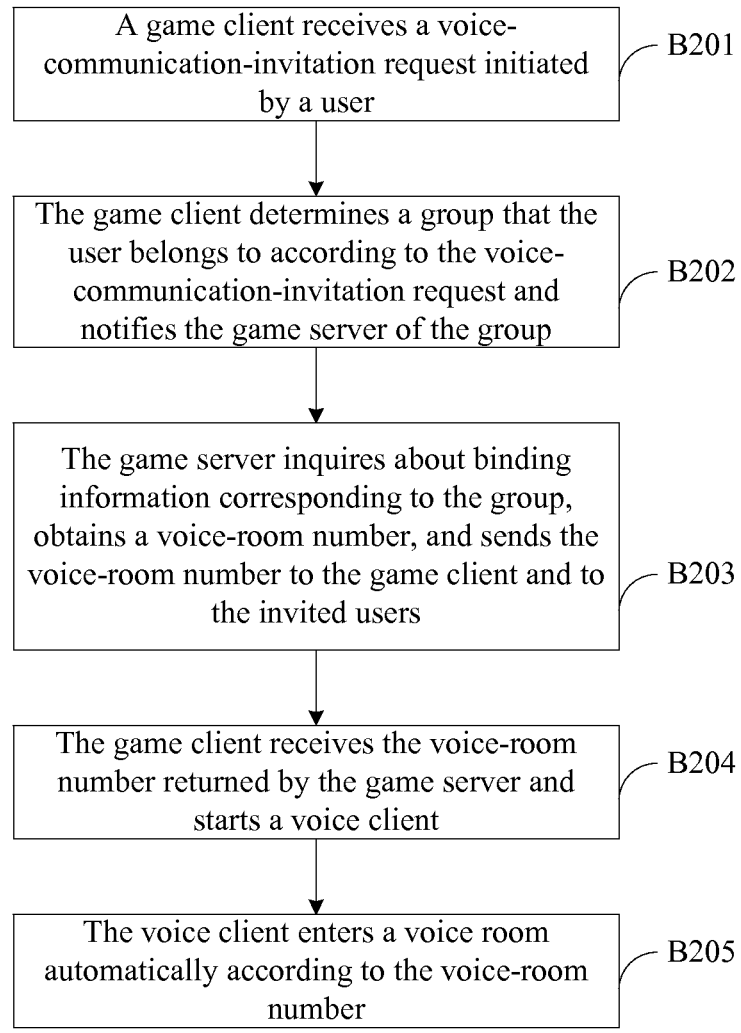
FIG. 2d depicts a flow diagram of an exemplary method for establishing voice communication (e.g., an invitation process in a binding-voice-room mode) in accordance with various disclosed embodiments.

In addition, a user can invite other users to join the voice communication. FIG. 2c depicts a scenario illustrating an invitation process in a binding-voice-room mode in accordance with various disclosed embodiments (the process of binding the voice-room number is not shown). FIG. 2d depicts a flow diagram of an exemplary method for establishing voice communication (e.g., including an invitation process in a binding-voice-room mode) in accordance with various disclosed embodiments. In an invitation process, the method of establishing voice communications can include the following steps, for example.

In Step B201, a game client receives a voice-communication-invitation request initiated by a user. An invited-user list can be carried in the voice-communication-invitation request. The invited-user list can indicate the invited users (i.e., can indicate other users that the user wants to invite).

For example, an invitation-trigger button can be set up in the game client. Thus, when the user triggers the invitation-trigger button, e.g., by clicking the invitation-trigger button, and when the user can choose the other users to invite, the game client can receive the voice-communication-invitation request initiated by the user.

The game client can be installed in a terminal, e.g., a personal computer, a mobile phone, a tablet computer or other suitable devices. In the example shown in FIG. 2c, the game client is installed in a user computer.

In Step B202, according to the voice-communication-invitation request, the group that the user (i.e., the user that initiates the voice-communication-invitation request) belongs to is determined and the game server is notified of the group that the user belongs to.

For example, in some games, game players may organize some fixed small groups, e.g., families, special groups (e.g., clans, gangs, tribes), etc. Thus, the game client can determine a family or a special group that the user belongs to according to the voice-communication-invitation request, and notify the game server of the family or special group that the user belongs to.

In Step B203, the game server inquires about binding information corresponding to the group that the user belongs to, obtains a voice-room number, and sends the voice-room number to the game client. In addition, the game server can also send the voice-room number to each of the invited users according to the invited-user list.

The binding information can be stored in a game database of the game server. For example, the user can apply for a voice-room number from a voice service provider, and then bind the voice-room number (obtained by application) with the group (e.g. a group in a game) though the game client. The binding information can be stored on the first server (or the game server).

For example, when the voice-room number is bound with the group (e.g. the family, or the special group, etc.), by knowing the family or the special group that the user belongs to, the corresponding voice-room number can be known according to the binding information.

The voice-communication-invitation request does not necessarily carry the invited-user list. When the invited-user list is not carried in the voice-communication-invitation request, the game server can send the voice-room number to all users of the group that the user belongs to.

In Step B204, the game client receives the voice-room number returned by the game server and starts a voice client.

For example, after the game client of each user (including the user who initiates the voice-communication-invitation request, and the invited users) receives the voice-room number returned by the game server, the voice client can be started. The voice client can be embedded in the game client.

In Step B205, the voice client enters a voice room automatically according to the voice-room number.

For example, the voice client of each user (including the user who initiates the voice-communication-invitation request, and the invited users) can enter the voice room automatically according to the voice-room number for voice communication.

According to various disclosed embodiments, the voice-room number can be bound with the group in the game and the binding information can be stored on the game server. When the user needs to obtain the voice-room number, the voice-room number can be automatically obtained by inquiring about the binding information by the game server, and can thus be provided to the game client. The voice client embedded in the game client can then be automatically started. Thus, according to the voice-room number, the voice client can enter the voice room for the voice communication. There is no need for the user(s) to mutually transmit the voice-room number by themselves through third-party software and then establish the voice communication according to the voice-room number. Therefore, time used for establishing the voice communication can be saved. In addition, since no third-party software needs to be involved, the operation can be relatively simple and can be easily managed.

In another embodiment, an apparatus for establishing voice communication can be a game client, for example. A first server can be a game server. A second server can be a voice server. In this example, a method for establishing voice communication can be implemented in a temporary-voice-room mode. In this case, as shown in FIGS. 3a-3b, an exemplary method for establishing voice communication can be as follows.

Figure 3A:
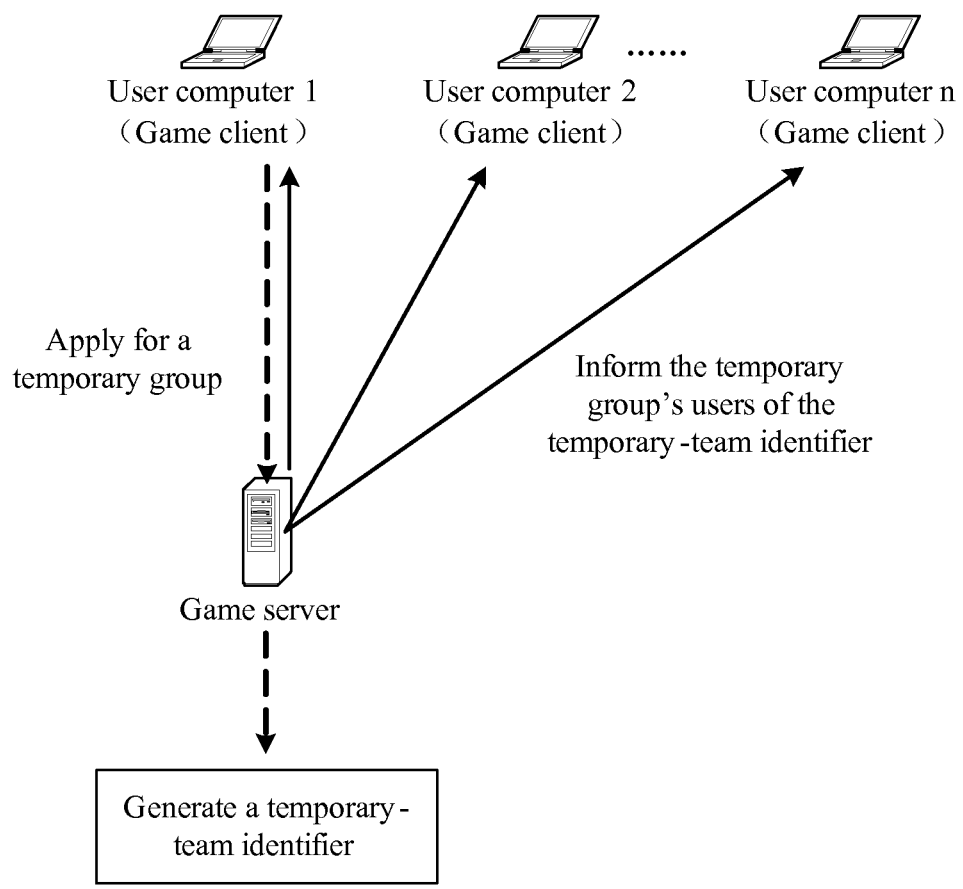
FIG. 3a depicts a scenario illustrating generating and broadcasting a temporary-team identifier in accordance with various disclosed embodiments.
Figure 3B:
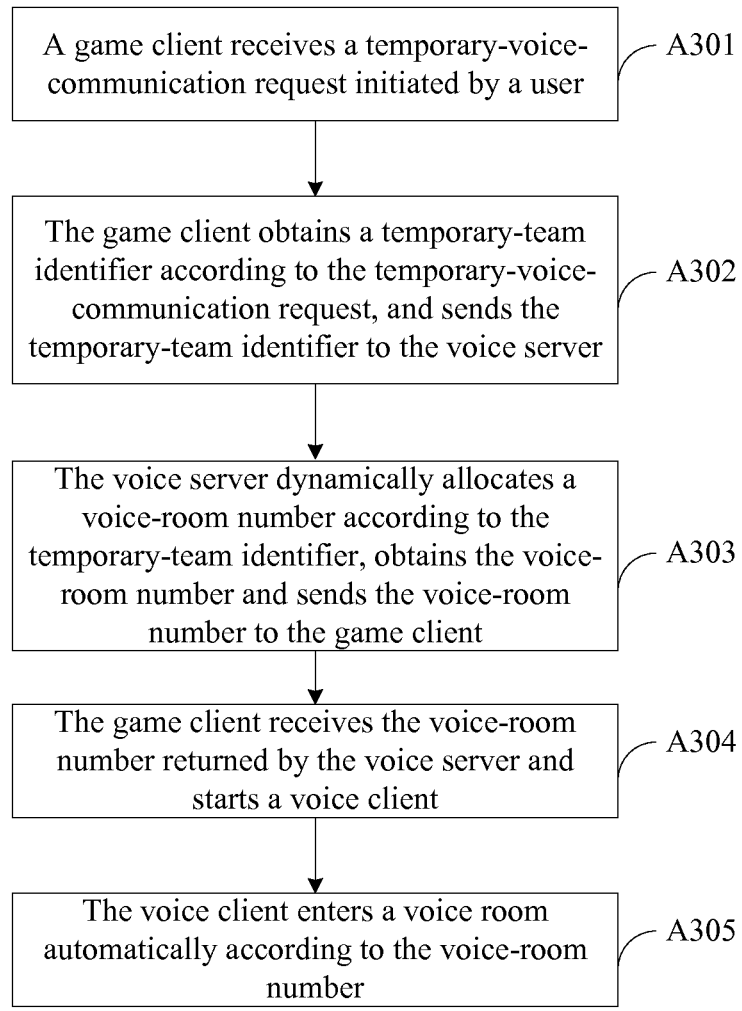
FIG. 3b depicts a flow diagram of an exemplary method for establishing voice communication (in a temporary-voice-room mode) in accordance with various disclosed embodiments.

FIG. 3a depicts a scenario illustrating generating and broadcasting a temporary-team identifier in accordance with various disclosed embodiments. FIG. 3b depicts a flow diagram of an exemplary method for establishing voice communication (in a temporary-voice-room mode) in accordance with various disclosed embodiments.

In Step A301, the game client receives a temporary-voice-communication request (or a temporary request) initiated by a user.

For example, a temporary-voice-communication-trigger button (or a temporary-trigger button) can be set up in the game client. Thus, when the user triggers the temporary-trigger button, e.g., by clicking the temporary-trigger button, the game client can receive the temporary request initiated by the user.

The game client can be installed in a terminal, e.g., a personal computer, a mobile phone, a tablet computer or other suitable devices. For illustration purposes, in the example shown in FIG. 3a, the game client is installed in a user computer.

In Step A302, the game client obtains a temporary-team identifier according to the temporary request, and sends the temporary-team identifier to the voice server.

In one embodiment, the temporary-team identifier can be generated by the game server and sent (or broadcasted) to all users of the temporary group when the temporary group is created. For example, when creating each temporary group, the game server can generate one temporary-team identifier in order to identify voice rooms subsequently. After creating the temporary group, the game server can notify all the users of the temporary group of the temporary-team identifier.

In Step A303, the voice server dynamically allocates a voice-room number according to the temporary-team identifier, obtains the voice-room number and sends the voice-room number to the game client.

In Step A304, the game client receives the voice-room number returned by the voice server and starts a voice client. In one embodiment, the voice client can be embedded in the game client.

In Step A305, the voice client enters a voice room automatically according to the voice-room number.

Figure 3C:
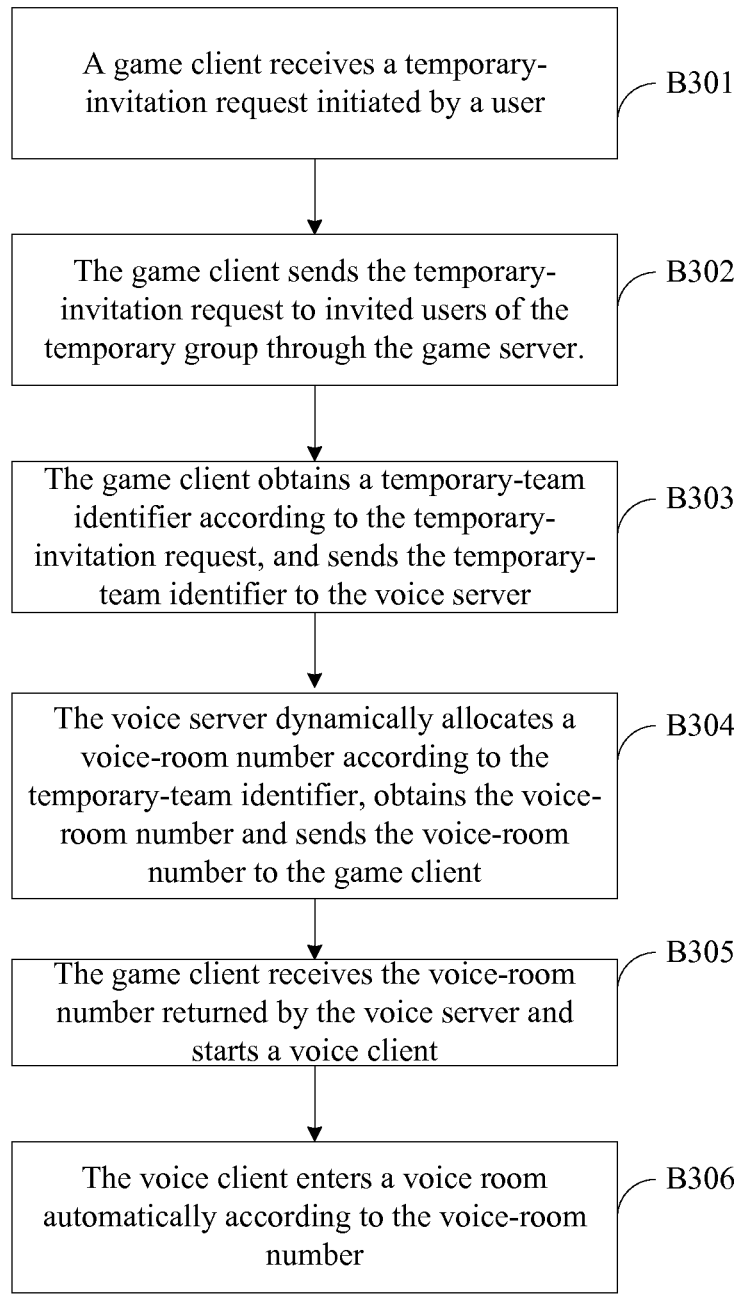
FIG. 3c depicts a flow diagram of an exemplary method for establishing voice communication (e.g., an invitation process in a temporary-voice-room mode) in accordance with various disclosed embodiments.

In addition, a user can invite other users to join the voice communication. FIG. 3c depicts a flow diagram of an exemplary method for establishing voice communication (e.g., including an invitation process in a temporary-voice-room mode) in accordance with various disclosed embodiments. In an invitation process, the method of establishing voice communications can be as follows.

In Step B301, a game client receives a temporary-voice-communication-invitation request (or a temporary-invitation request) initiated by a user. An invited-user list can be carried in the temporary-voice-communication-invitation request. The invited-user list can indicate invited users (i.e., can indicate other users that the user wants to invite).

For example, a temporary-voice-communication-invitation-trigger button (or a temporary-invitation-trigger button) can be set up in the game client. Thus, when the user triggers the temporary-invitation-trigger button, e.g., by clicking the temporary-invitation-trigger button, the game client can receive the temporary-invitation request initiated by the user.

In Step B302, the game client sends the temporary-invitation request to the invited users of the temporary group via the game server.

For example, when the invited-user list is carried in the temporary-invitation request, the game server can send the temporary-invitation request to the invited users. When the invited-user list is not carried in the temporary-invitation request, the game server can send the temporary-invitation request to all the users of the temporary group.

In Step B303, the game client obtains a temporary-team identifier according to the temporary-invitation request, and sends the temporary-team identifier to the voice server.

For example, the game client of each user (including the user initiating the temporary-invitation request, and the invited users) can obtain the temporary-team identifier according to the temporary-invitation request, and send the temporary-team identifier to the voice server.

In one embodiment, the temporary-team identifier can be generated by the game server and sent (or broadcasted) to all users of the temporary group when the temporary group is created. For example, when creating each temporary group, the game server can generate one temporary-team identifier in order to identify voice rooms subsequently. After creating the temporary group, the game server can notify all the users of the temporary group of the temporary-team identifier.

In Step B304, the voice server dynamically allocates a voice-room number according to the temporary-team identifier, obtains the voice-room number and sends the voice-room number to the game client.

In Step B305, the game client receives the voice-room number returned by the voice server and starts a voice client.

For example, the game client of each user (including the user who initiates the temporary-invitation request, and the invited users) can receive the voice-room number returned by the voice server and start the voice client.

In one embodiment, the voice client can be embedded in the game client.

In Step B306, the voice client enters a voice room automatically according to the voice-room number.

For example, the voice client of each user (including the user who initiates the temporary-invitation request, and the invited users) can enter the voice room automatically for voice communication, according to the voice-room number.

According to various disclosed embodiments, when creating temporary groups, the game server can generate one temporary-team identifier for each temporary group, in order to identify voice rooms subsequently. After the creation, the game server can inform all users (of the temporary group) of the temporary-team identifier. Thus, when the user or the users need to obtain the voice-room number, the voice server can dynamically allocate a free voice-room number according to the temporary-team identifier sent by the user and send the voice-room number to the game client. The game client can start the voice client automatically. So the voice client can enter the voice room automatically for voice communication, according to the voice-room number. There is no need for the user(s) to mutually transmit the voice-room number by themselves through third-party software and then establish the voice communication according to the voice-room number. Therefore, time used for establishing the voice communication can be saved. In addition, since no third-party software needs to be involved, the operation can be relatively simple and can be easily managed.

In yet another embodiment, an apparatus for establishing voice communication can be a game client, for example. A first server can be a game server. A second server can be a voice server. In this example, a method for establishing voice communication can be implemented in an exclusive-voice-room mode. In this case, as shown in FIG. 4a, an exemplary method for establishing voice communication can be as follows.

Figure 4A:
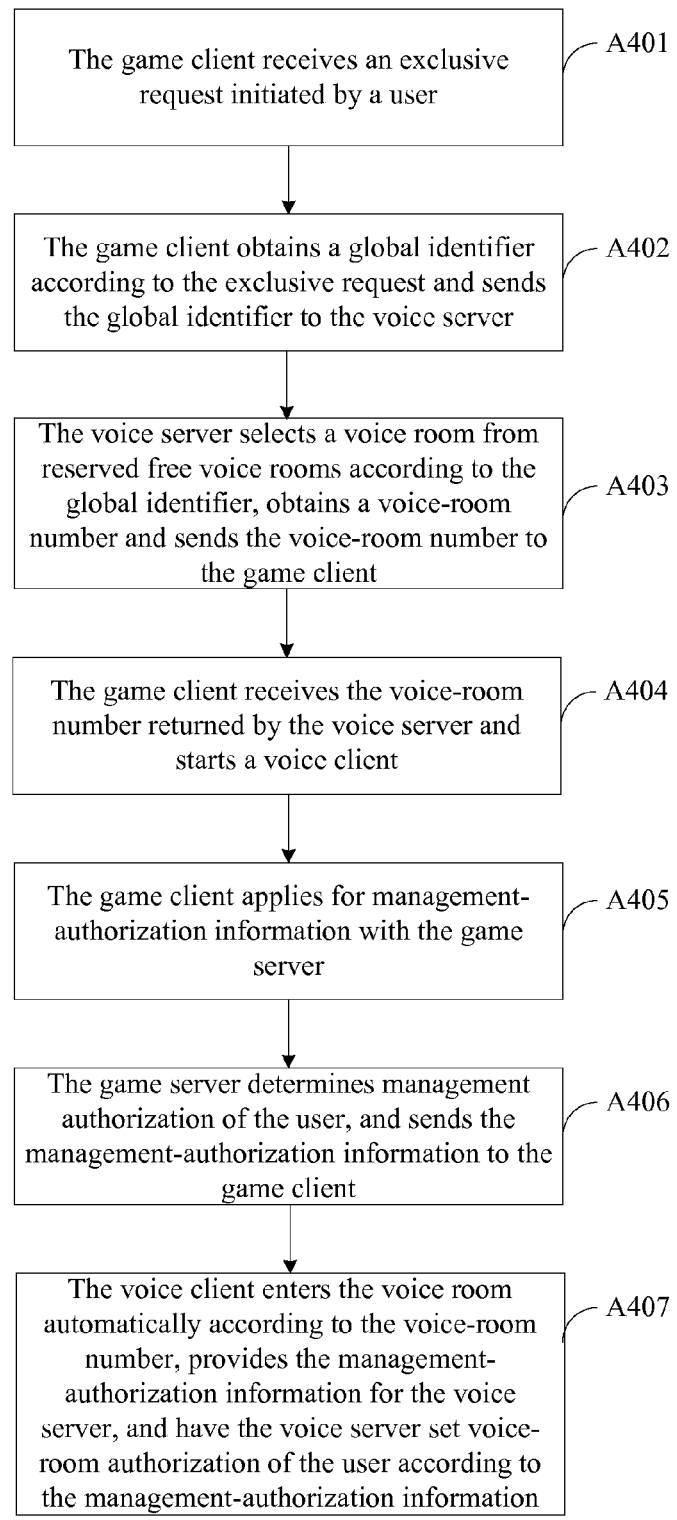
FIG. 4a depicts a flow diagram of an exemplary method for establishing voice communication (in an exclusive-voice-room mode) in accordance with various disclosed embodiments.

FIG. 4a depicts a flow diagram of an exemplary method for establishing voice communication (in an exclusive-voice-room mode) in accordance with various disclosed embodiments.

Referring to FIG. 4a, in Step A401, a game client receives an exclusive-room-voice-communication request (or an exclusive request) initiated by a user.

For example, an exclusive-room-voice-communication-trigger button (or an exclusive-trigger button) can be set up in the game client. Thus, when the user triggers the exclusive-trigger button, e.g., by clicking the exclusive-trigger button, the game client can receive the exclusive request initiated by the user.

The game client can be installed in a terminal, e.g., a personal computer, a mobile phone, a tablet computer or other suitable devices. For illustration purposes, in the example shown in FIG. 4a, the game client is installed in a user computer.

In Step A402, the game client obtains a global identifier according to the exclusive request, and sends the global identifier to the voice server.

In one embodiment, when a fixed group is created, the global identifier can be generated by the game server and sent (or broadcasted) to all users of the fixed group. For example, the game server can generate one global identifier for each fixed group according to a specific algorithm and map each global identifier to a reserved voice room. When each user logs in to the game server, the game server can inform the logged-in user of the global identifier corresponding to the fixed group that the user belongs to.

In Step A403, the voice server selects a voice room from the reserved free voice rooms according to the global identifier, obtains a voice-room number and sends the voice-room number to the game client.

In Step A404, the game client receives the voice-room number returned by the voice server and starts a voice client. In one embodiment, the voice client can be embedded in the game client.

In one embodiment, the user can also apply for management-authorization information from the game server, e.g., apply for management authorization signatures or any other management-authorization information. In this case, Steps A405-A406 can be performed.

In Step A405, the game client applies for the management-authorization information from the game server.

The management-authorization information (e.g., the management authorization signatures) can be generated using certain common symmetric encryption algorithm(s), and can store management authorization of voice room(s), e.g., whether to allow speaking, whether to allow kicking (a type of command or action, e.g., in games), or whether to allow setting other user's authorization to speak. Authorization can be set based on the needs of practical applications. For example, voice-room authorization can be set correspondingly according to certain information, e.g., the user's job position in the fixed group.

In Step A406, the game server determines the management authorization of the user, and sends the management-authorization information to the game client.

In Step A407, the voice client enters the voice room automatically according to the voice-room number, and, optionally, provides the management-authorization information for the voice server. Thus, the voice server can set voice-room authorization of the user according to the management-authorization information.

Figure 4B:
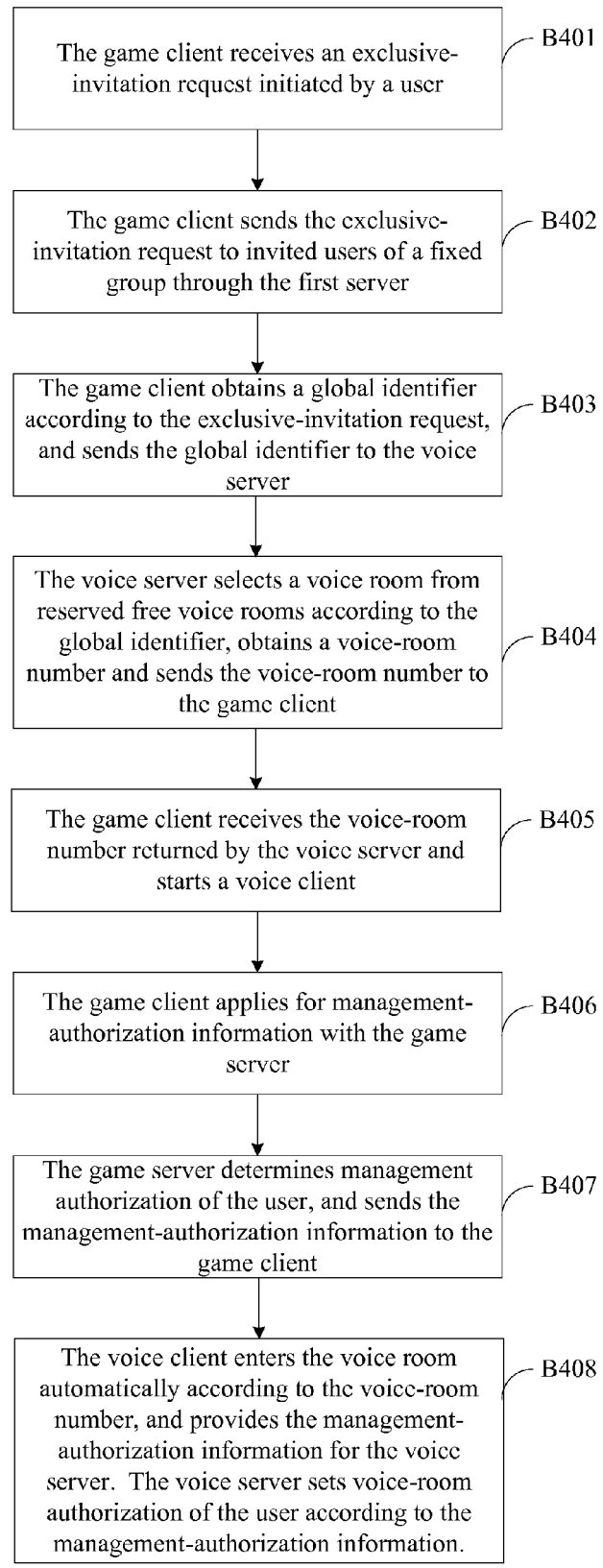
FIG. 4b depicts a flow diagram of an exemplary method for establishing voice communication (e.g., an invitation process in an exclusive-voice-room mode) in accordance with various disclosed embodiments.

In addition, a user can invite other users to join the voice communication. FIG. 4b depicts a flow diagram of an exemplary method for establishing voice communication (e.g., including an invitation process in an exclusive-voice-room mode) in accordance with various disclosed embodiments. In an invitation process, the method of establishing voice communications can include the following steps.

In Step B401, a game client receives an exclusive-room-voice-communication-invitation request (or an exclusive-invitation request) initiated by a user. An invited-user list can be carried in the exclusive-invitation request. The invited-user list can indicate invited users (i.e., can indicate other users that the user wants to invite).

For example, an exclusive-voice-communication-invitation-trigger button (or an exclusive-invitation-trigger button) can be set up in the game client. Thus, when the user triggers the exclusive-invitation-trigger button, e.g., by clicking the exclusive-invitation-trigger button, the game client can receive the exclusive-invitation request initiated by the user.

In Step B402, the game client sends the exclusive-invitation request to the invited users of the fixed group via the first server (e.g., the game server).

For example, when the invited-user list is carried in the exclusive-invitation request, the game server can send the exclusive-invitation request to the invited users. When the invited-user list is not carried in the exclusive-invitation request, the game server can send the exclusive-invitation request to all the users of the fixed group.

In Step B403, the game client obtains a global identifier according to the exclusive-invitation request, and sends the global identifier to the voice server.

For example, the game client of each user (including the user initiating the exclusive-invitation request, and the invited users) can obtain the global identifier according to the exclusive-invitation request and send the global identifier to the voice server.

In one embodiment, the global identifier can be generated by the game server and sent (or broadcasted) to all users of the fixed group when the fixed group is created. For example, the game server can generate one global identifier for each fixed group according to a specific algorithm and map each global identifier to a reserved voice room. When each user logs in to the game server, the game server can inform the logged-in user of the global identifier corresponding to the fixed group that the user belongs to.

For example, there can be certain fixed organizations in some large-scale network games, e.g., nations, alliances, etc. In this case, the game server can generate one global identifier for each fixed group (e.g., nations, alliances, etc.) according to the specific algorithm, map the global identifier to a reserved voice room and send the global identifier to the game clients of all the users of the corresponding nation or alliance.

In Step B404, the voice server selects a voice room from the reserved free voice rooms according to the global identifier, obtains a voice-room number and sends the voice-room number to the game client.

In Step B405, the game client receives the voice-room number returned by the voice server and starts a voice client.

For example, the game client of each user (including the user who initiates the exclusive-invitation request, and the invited users) can receive the voice-room number returned by the voice server and start the voice client.

In one embodiment, the voice client can be embedded in the game client.

In one embodiment, the user can also apply for management-authorization information from the game server, e.g., apply for management authorization signatures or any other management-authorization information. In this case, Steps B406-B407 can be performed.

In Step B406, the game client applies for the management-authorization information from the game server.

For example, each user (including the user who initiates the exclusive-invitation request, and the invited users) can respectively apply for the management-authorization information from the game server.

In one embodiment, the management-authorization information (e.g., the management authorization signatures) can be generated using certain common symmetric encryption algorithm(s), and can store management authorization of voice room(s), e.g., whether to allow speaking, whether to allow kicking (a type of command or action, e.g., in games), or whether to allow setting other user's authorization to speak. Authorization can be set based on the needs of practical applications. For example, voice authorization can be set correspondingly according to certain information, e.g., the user's job position in the fixed group.

In Step B407, the game server determines the management authorization of the user, and sends the management-authorization information to the game client.

For example, the game server can determine the management authorization of each user (including the user who initiates the exclusive-invitation request, and the invited users), and send the management-authorization information to each user, respectively.

In Step B408, the voice client enters the voice room automatically according to the voice-room number, and, optionally, provides the management-authorization information for the voice server. Thus, the voice server can set voice-room authorization of the user according to the management-authorization information.

For example, the voice client of each user (including the user who initiates the exclusive-invitation request, and the invited users) can enter the voice room automatically according to the voice-room number, and can provide the respective management-authorization information for the voice server. Thus, the voice server can set the voice-room authorization of the user according to the management-authorization information in order to perform the voice communication.

In one embodiment, when the management-authorization information is generated using a certain common symmetric encryption algorithm, after the user enters the voice room, the voice server can decrypt the management-authorization information according to the symmetric algorithm and shared encryption key (or key), thus obtaining and setting the management-authorization information of the user.

According to various disclosed embodiments, one global identifier can be generated for each fixed group, and be mapped to a reserved voice room. When a user logs in to the game server, the global identifier can be provided for the game client. The game client can obtain a voice-room number from the voice server according to the global identifier, and, according to the voice-room number, automatically start the voice client embedded in the game client. The voice client can enter the voice room for voice communication, according to the voice-room number. There is no need for the user(s) to mutually transmit the voice-room number by themselves through third-party software and then establish the voice communication according to the voice-room number. Therefore, time used for establishing the voice communication can be saved. In addition, since no third-party software needs to be involved, the operation can be relatively simple and can be easily managed.

Figure 5:
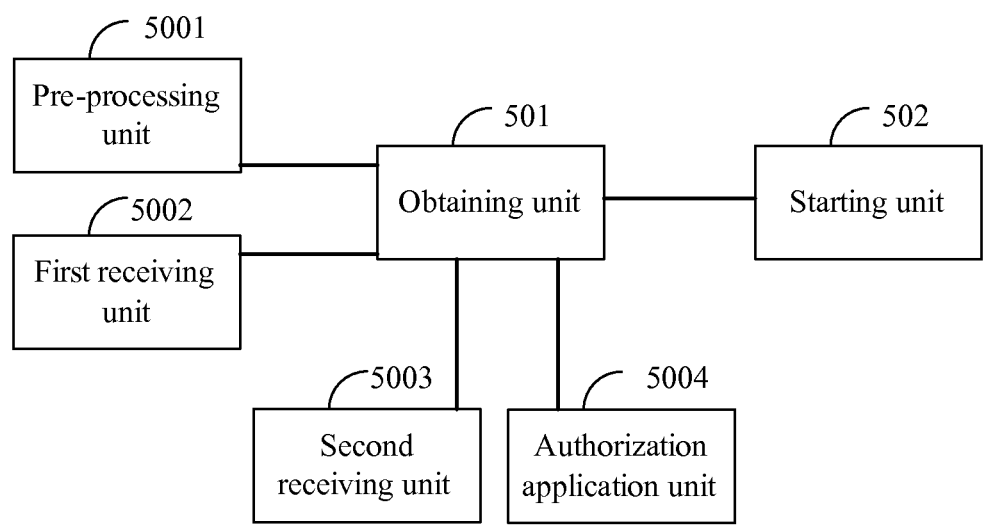
FIG. 5 depicts a structure diagram of an exemplary apparatus for establishing voice communication in accordance with various disclosed embodiments.

Various disclosed embodiments also provide an apparatus for establishing voice communication. The apparatus can be used to implement the methods for establishing voice communication as depicted above in various embodiments. In various embodiments, the apparatus can be used as an application client, e.g., a game client. FIG. 5 depicts a structure diagram of an exemplary apparatus for establishing voice communication in accordance with various disclosed embodiments. The apparatus for establishing voice communication can include an obtaining unit 501, and a starting unit 502. Some units may be omitted and other units may be included.

The obtaining unit 501 is configured to obtain a voice-room number.

The starting unit 502 is configured to start a voice client. The voice client can enter a voice room according to the voice-room number. In one embodiment, the voice client can be embedded in the apparatus for establishing voice communication, e.g., embedded in the game client.

The voice-room number can be obtained by a variety of ways according to different application scenarios as shown in the following examples.

In one example, the voice-room number can be obtained in a binding-voice-room mode.

The binding-voice-room mode may apply to fixed small groups organized by certain users, e.g. the fixed small groups organized by certain players in games, which can include families, special group (e.g., clans, gangs, tribes), etc.

For example, in the binding-voice-room mode, a group that the user belongs to can be determined first. The voice-room number can then be obtained via a first server (e.g., a game server).

For example, the obtaining unit 501 can be configured to receive a voice-communication request initiated by a user, determine a group that the user belongs to according to the voice-communication request, notify the first server of the group that the user belongs to and receive a voice-room number returned by the first server.

In addition, the user can also invite other users to voice communication. In a voice invitation process, for example, the obtaining unit 501 can be configured to receive a voice-communication-invitation request initiated by a user, determine the group that the user belongs to according to the voice-communication-invitation request, notify the first server of the group that the user belongs to, and receive a voice-room number returned by the first server. The first server can send the voice-room number to the users of the group that the user belongs to.

Optionally, in order to improve flexibility of the voice communication, the invitation request can carry an invited-user list. When the invited-user list is carried in the invitation request, the first server can send the voice-room number to invited users according to the invited-user list. That is, the voice-room number can be obtained by the following steps. For example, the obtaining unit 501 can be configured to receive a voice-communication-invitation request initiated by the user and carrying the invited-user list, determine the group that the user belongs to according to the invitation request, notify the first server of the group that the user belongs to, and receive the voice-room number returned by the first server. The first server can send the voice-room number to the users of the group that the user belongs to.

The voice-room number can be obtained by the first server by inquiring about the binding information corresponding to the group that the user belongs to. For example, the user can apply for the voice-room number from a voice service provider, and then bind the voice-room number (obtained by applying) with the group (e.g., a group organization in a game) though the application client. The binding information can be stored on the first server. Thus, when the application client needs to obtain the voice-room number, the first server can obtain the voice-room number by inquiring about the binding information corresponding to the group that the user belongs to, and thus provide the voice-room number for the terminal.

Thus, optionally, the apparatus for establishing voice communication can further include a pre-processing unit 5001. The pre-processing unit 5001 is configured to obtain the voice-room number the user applies for, bind the voice-room number with group, obtain the binding information, and store the binding information on the first server.

In another example, the voice-room number can be obtained in a temporary-voice-room mode.

Temporary voice rooms can refer to voice rooms provided for certain temporary or random groups, e.g., temporary teams in a game or other suitable groups. In the temporary-voice-room mode, a voice communication function may need to be provided for a temporary group without a need to apply for a binding-voice-room number beforehand.

In the temporary-voice-room mode, the voice-room number can be obtained via a second server according to a temporary-team identifier.

For example, the obtaining unit 501 can be configured to receive a temporary-voice-communication request (or a temporary request) initiated by the user, obtain the temporary-team identifier according to the temporary request, send the temporary-team identifier to the second server, and receive a voice-room number returned by the second server.

In addition, the user can invite other users to join the voice communication. In the voice invitation process, the voice-room number can be obtained by the following steps. For example, the obtaining unit 501 can be configured to receive a temporary-voice-communication-invitation request (or a temporary-invitation request) initiated by the user, send the temporary-invitation request to users in the temporary group via the first server, obtain the temporary-team identifier according to the temporary-invitation request, send the temporary-team identifier to the second server, and receive a voice-room number returned by the second server.

Optionally, in order to improve flexibility of the voice communication, an invited-user list can be carried in the temporary-invitation request. When the temporary-invitation request carries the invited-user list, the first server can send the temporary-invitation request to the invited users according to the invited-user list.

For example, the obtaining unit 501 can be configured to receive the temporary-invitation request initiated by the user. The temporary-invitation request can carry the invited-user list. On one hand, the obtaining unit 501 can be configured to send the temporary-invitation request to the first server, so the first server can send the temporary-invitation request to the invited users according to the invited-user list. On the other hand, the obtaining unit 501 can be configured to obtain the temporary-team identifier according to the temporary-invitation request, send the temporary-team identifier to the second server, and receive a voice-room number returned by the second server.

In one embodiment, the voice-room number can be obtained by the second server by allocating a free voice room according to the temporary-team identifier of the temporary group. For example, when the first server creates temporary groups, one temporary-team identifier can be generated for each temporary group, in order to identify voice rooms subsequently. After the creation, the first server can inform all users (of the temporary group) of the temporary-team identifier. Thus, when needing to obtain the voice-room number, the user or the users can simply send the temporary-team identifier. The second server can dynamically allocate the free voice room according to the temporary-team identifier, and provide the allocated voice-room number for the users of the clients.

Thus, optionally, the apparatus for establishing voice communication can further include a first receiving unit 5002. The first receiving unit 5002 is configured to receive the temporary-team identifier sent by the first server. The temporary-team identifier can be generated by the first server when the temporary group is created.

In yet another example, the voice-room number can be obtained in an exclusive-voice-room mode.

Exclusive voice rooms can refer to fixed exclusive voice rooms provided for certain fixed groups, e.g., exclusive game rooms. For example, there can be certain fixed organizations in some large-scale network games, e.g., nations, alliances, etc., for which fixed exclusive voice rooms may generally need to be provided.

In the exclusive-voice-room mode, the voice-room number can be obtained by the following steps. For example, the obtaining unit 501 can be configured to receive an exclusive-room-voice-communication request (or an exclusive request) initiated by a user, obtain a global identifier according to the exclusive request, send the global identifier to the second server, and receive a voice-room number returned by the second server.

In addition, the user can invite other users to join the voice communication. In a voice invitation process, the voice-room number can be obtained by the following steps. For example, the obtaining unit 501 can be configured to receive an exclusive-room-voice-communication-invitation request (or an exclusive-invitation request) initiated by the user, send the exclusive-invitation request to users in the fixed group via the first server, obtain the global identifier according to the exclusive-invitation request, send the global identifier to the second server, and receive a voice-room number returned by the second server.

Optionally, in order to improve flexibility of the voice communication, an invited-user list can be carried in the exclusive-invitation request. When the exclusive-invitation request carries the invited-user list, the first server can send the exclusive-invitation request to the invited users according to the invited-user list. That is, the voice-room number can be obtained by the following steps.

For example, the obtaining unit 501 can be configured to receive the exclusive-invitation request initiated by the user. The exclusive-invitation request can carry the invited-user list. On one hand, the obtaining unit 501 can be configured to send the exclusive-invitation request to the first server, so the first server can send the exclusive-invitation request to the invited users according to the invited-user list. On the other hand, the obtaining unit 501 can be configured to obtain the global identifier according to the exclusive-invitation request, send the global identifier to the second server, and receive the voice-room number returned by the second server.

The voice-room number can be obtained by the second server by selecting from reserved free voice rooms according to the global identifier.

For example, the first server (e.g., a game server) can generate one global identifier for each fixed group according to a specific algorithm, and map each global identifier to a reserved voice room (correspondingly). When each user logs in to the first server, the first server can inform the user of the global identifier of the fixed group that the user belongs to, so that the corresponding voice-room number can be obtained subsequently according to the global identifier.

Thus, optionally, the apparatus for establishing voice communication can further include a second receiving unit 5003. The second receiving unit 5003 is configured to receive the global identifier broadcasted by the first server when logging in to the first server. The global identifier can be generated by the first server when the fixed group is created.

In addition, after the user logs in to the first server, in addition to obtaining the voice-room number via the obtaining unit 501, the user can also apply for management-authorization information from the first server, e.g., apply for management authorization signatures or any other management-authorization information. The management-authorization information can be generated using certain common symmetric encryption algorithm(s), and can store management authorization of voice room(s), e.g., whether to allow speaking, whether to allow kicking (a type of command or action, e.g., in games), or whether to allow setting other user's authorization to speak. Authorization can be set based on the needs of practical applications. For example, voice-room authorization can be set correspondingly according to certain information, e.g., the user's job position in the fixed group. When the user enters the voice room, the management-authorization information can be decrypted by the second server, e.g., a voice server, according to the symmetric algorithm and a shared key. Accordingly, voice-room authorization of the user can be obtained and set.

Optionally, the apparatus for establishing voice communication can further include an authorization application unit 5004.

The authorization application unit 5004 is configured to apply for the management-authorization information from the first server. Thus, after entering the voice room, the second server can set the voice-room authorization of the user(s) according to the management-authorization information (e.g., obtained by applying).

In one embodiment, the first server can be an application server, e.g., a game server or other suitable servers. The second server can be a voice server, or other servers that can provide voice service. The game client can be installed in a terminal, e.g., a personal computer, a mobile phone, a tablet computer or other suitable devices.

In practical implementation, each of the units depicted above in accordance with various embodiments can be implemented as an independent entity, or can be arbitrarily combined to be implemented as one entity or multiple entities. The implementation of the units can be similar to or the same as the above-described methods in accordance with various disclosed embodiments.

Therefore, in various embodiments, the obtaining unit 501 is configured to obtain a voice-room number automatically. The starting unit 502 is configured to start the voice client automatically, so the voice client can enter the voice room for voice communication according to the voice-room number. Thus, there is no need for the user(s) to mutually transmit the voice-room number by themselves through third-party software and then establish the voice communication according to the voice-room number. Therefore, time used for establishing the voice communication can be saved. In addition, since no third-party software needs to be involved, the operation can be relatively simple and can be easily managed.

Accordingly, various embodiments also provide a communication system. The communication system can include the apparatus for establishing voice communication in accordance with various disclosed embodiments. The apparatus for establishing voice communication can serve as an application client, e.g., a game client. In this case, the application client can be configured to obtain a voice-room number and start a voice client, such that the voice client can enter a voice room according to the voice-room number.

The application client can obtain the voice-room number by a variety of methods according to different application scenarios. For example, the application scenarios can include a binding-voice-room mode, a temporary-voice-room mode, an exclusive-voice-room mode, and/or other suitable scenarios. The methods for obtaining the voice-room number in the various application scenarios can be similar to or the same as the methods as depicted in accordance with various embodiments.

In addition, the communication system may further include a first server (e.g., a game server), a second server (e.g., a voice server) and a voice client. In one embodiment, the voice client can be embedded in the application client, e.g., embedded in the game client.

For example, the first server can be configured to provide communication between the various application clients, and manage the various application clients, etc.

The second server can be configured to provide the voice-room number to the application clients, e.g., the game clients, and provide voice communication service for the users after the users enter the voice room. The method for obtaining the voice-room number by the second server can be similar to or the same as the methods depicted above in accordance with various embodiments.

The voice client is configured to receive a starting operation by the application client (e.g., the game client), and enter the voice room according to the voice-room number, which can be implemented in a manner similar to or the same as the methods depicted above in accordance with various embodiments.

In addition, the voice server can also be configured to set voice-room authorization of the user(s) according to management-authorization information (e.g., management authorization signatures), which can be implemented in a manner similar to or the same as the methods depicted above in accordance with various embodiments.

The implementation of each of the above devices can be similar to or the same as exemplary methods depicted above in accordance with various embodiments.

According to various embodiments, a communication system is provided. In the communication system, an apparatus for establishing voice communication can automatically obtain a voice-room number from a first server (e.g., a game server) or a second server (e.g., a voice server), and automatically start a voice client, so the voice client can enter a voice room for voice communication according to the voice-room number. There is no need for the user(s) to mutually transmit the voice-room number by themselves through third-party software and then establish the voice communication according to the voice-room number. Therefore, time used for establishing the voice communication can be saved. In addition, since no third-party software needs to be involved, the operation can be relatively simple and can be easily managed.

In various embodiments, one or more or all of the steps in each of the exemplary methods herein can be accomplished using a program/software to instruct related hardware. Such program/software can be stored in a non-transitory computer readable storage medium including, e.g., ROM/RAM, magnetic disk, optical disk, etc.

Further, in various embodiments, the clients (e.g., the application clients, game clients, voice clients, etc.) can include program/software components, hardware components, or a combination of software and hardware components. The hardware components may be implemented by a part or whole of the computing systems as disclosed in accordance with various embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods, apparatus and systems can be used in a variety of Internet applications. In an exemplary method, a request initiated by a user can be received. Based on various modes of establishing voice communication, the request can include one of a voice-communication request, a voice-communication-invitation request, a temporary-voice-communication request, a temporary-voice-communication-invitation request, an exclusive-voice-communication request, and an exclusive-voice-communication-invitation request. According to the request, a voice-room number can be obtained from a first server or a second server, without using third-party communication software. The method further includes starting a voice client and entering a voice room directly using the voice client, according to the voice-room number.

Thus, by using the disclosed methods, apparatus and systems, there is no need for the user(s) to mutually transmit the voice-room number by themselves through third-party software and then establish the voice communication according to the voice-room number. Therefore, time used for establishing the voice communication can be saved. In addition, since no third-party software needs to be involved, the operation can be relatively simple and can be easily managed.

What is claimed is:

1. A method for establishing voice communication, implemented by an electronic device, comprising:
   receiving a request initiated by a user, wherein the request includes one of:
      a voice-communication request;
      a voice-communication-invitation request;
      a temporary-voice-communication request;
      a temporary-voice-communication-invitation request;
      an exclusive-voice-communication request; and
      an exclusive-voice-communication-invitation request;
   obtaining a voice-room number from a first server or a second server according to the request, without using third-party communication software;
   starting a voice client; and
   entering a voice room directly using the voice client, according to the voice-room number;
   wherein, when the request is the temporary-voice-communication request, the obtaining of the voice-room number includes:
      obtaining a temporary-team identifier according to the temporary-voice-communication request
      sending the temporary-team identifier to the second server; and
      receiving the voice-room number returned by the second server, wherein the voice-room number is obtained by the second server by allocating a free voice-room number according to the temporary-team identifier.

2. The method according to claim 1, wherein, when the request is the voice-communication request, the obtaining of the voice-room number includes:
   determining a group that the user belongs to, according to the voice-communication request;
   notifying the first server of the group that the user belongs to; and
   receiving the voice-room number returned by the first server, wherein the voice-room number is obtained by the first server by inquiring about binding information corresponding to the group.

3. The method according to claim 1, wherein, when the request is the voice-communication-invitation request, the obtaining of the voice-room number includes:
   determining a group that the user belongs to, according to the voice-communication-invitation request;
   notifying the first server of the group that the user belongs to; and
   receiving the voice-room number returned by the first server, wherein the first server sends the voice-room number to users in the group, and the voice-room number is obtained by the first server by inquiring about binding information corresponding to the group.

4. The method according to claim 3, wherein, before the receiving of the request, the method further includes:
   obtaining the voice-room number that the user applies for;
   binding the voice-room number with the group to obtain the binding information; and
   storing the binding information on the first server.

5. The method according to claim 1, wherein, when the request is the temporary-voice-communication-invitation request, the obtaining of the voice-room number includes:
   sending the temporary-voice-communication-invitation request to users of a temporary group via the first server;
   obtaining a temporary-team identifier according to the temporary-voice-communication-invitation request;
   sending the temporary-team identifier to the second server; and
   receiving the voice-room number returned by the second server, wherein the voice-room number is obtained by the second server by allocating a free voice-room number according to the temporary-team identifier.

6. The method according to claim 5, wherein, before the receiving of the request, the method further includes:
   receiving the temporary-team identifier sent by the first server, wherein the first server generates the temporary-team identifier when creating the temporary group.

7. The method according to claim 1, wherein, when the request is the exclusive-voice-communication request, the obtaining of the voice-room number includes:
   obtaining a global identifier according to the exclusive-voice-communication request;
   sending the global identifier to the second server; and
   receiving the voice-room number returned by the second server, wherein the voice-room number is obtained by the second server by selecting from reserved free voice rooms according to the global identifier.

8. The method according to claim 1, wherein, when the request is the exclusive-voice-communication-invitation request, the obtaining of the voice-room number includes:
sending the exclusive-voice-communication-invitation request to users of a fixed group via the first server;
obtaining a global identifier according to the exclusive-voice-communication-invitation request;
sending the global identifier to the second server; and
receiving the voice-room number returned by the second server, wherein the voice-room number is obtained by the second server by selecting from reserved free voice rooms according to the global identifier.

9. The method according to claim 8, wherein, before the receiving of the request, the method further includes:
when logging in to the first server, receiving the global identifier broadcasted by the first server, wherein the first server generates the global identifier when creating the fixed group.

10. The method according to claim 9, wherein, after the receiving of the voice-room number returned by the second server, the method further includes:
applying for management-authorization information from the first server, wherein after the voice client enters the voice room automatically, the second server sets voice-room authorization according to the management-authorization information.

11. An apparatus for establishing voice communication, comprising: one or more processors; memory; and one or more programs stored in the memory and to be executed by the one or more processors, the one or more program comprising:
an obtaining unit configured to:
receive a request initiated by a user, wherein the request includes one of:
a voice-communication request;
a voice-communication-invitation request;
a temporary-voice-communication request;
a temporary-voice-communication-invitation request;
an exclusive-voice-communication request; and
an exclusive-voice-communication-invitation request; and
obtain a voice-room number from a first server or a second server according to the request, without using third-party communication software; and
a starting unit configured to:
start a voice client; and
enter a voice room directly using the voice client, according to the voice-room number;
wherein, when the request is the temporary-voice-communication request, the obtaining unit is further configured to:
obtain a temporary-team identifier according to the temporary-voice-communication request;
send the temporary-team identifier to the second server; and
receive the voice-room number returned by the second server, wherein the voice-room number is obtained by the second server by allocating a free voice-room number according to the temporary-team identifier.

12. The apparatus according to claim 11, wherein, when the request is the voice-communication request, the obtaining unit is further configured to:
determine a group that the user belongs to, according to the voice-communication request;
notify the first server of the group; and
receive the voice-room number returned by the first server, wherein the voice-room number is obtained by the first server by inquiring about binding information corresponding to the group.

13. The apparatus according to claim 11, wherein, when the request is the voice-communication-invitation request, the obtaining unit is further configured to:
determine a group that the user belongs to, according to the invitation request;
notify the first server of the group; and
receive the voice-room number returned by the first server, wherein the first server sends the voice-room number to users in the group, and the voice-room number is obtained by the first server by inquiring about binding information corresponding to the group.

14. The apparatus according to claim 13, further including a pre-processing unit configured to:
obtain the voice-room number that the user applies for;
bind the voice-room number with the group to obtain the binding information; and
storing the binding information on the first server.

15. The apparatus according to claim 11, wherein, when the request is the temporary-voice-communication-invitation request, the obtaining unit is further configured to:
send the temporary-voice-communication-invitation request to users of a temporary group via the first server;
obtain a temporary-team identifier according to the temporary-voice-communication-invitation request;
send the temporary-team identifier to the second server; and
receive the voice-room number returned by the second server, wherein the voice-room number is obtained by the second server by allocating a free voice-room number according to the temporary-team identifier.

16. The apparatus according to claim 15, further including a first receiving unit configured to:
receive the temporary-team identifier sent by the first server, wherein the first server generates the temporary-team identifier when creating the temporary group.

17. The apparatus according to claim 11, wherein, when the request is the exclusive-voice-communication request, the obtaining unit is further configured to:
obtain a global identifier according to the exclusive-voice-communication request;
send the global identifier to the second server; and
receive the voice-room number returned by the second server, wherein the voice-room number is obtained by the second server by selecting from reserved free voice rooms according to the global identifier.

18. The apparatus according to claim 11, wherein, when the request is the exclusive-voice-communication-invitation request, the obtaining unit is further configured to:
send the exclusive-voice-communication-invitation request to users of a fixed group via the first server;
obtain a global identifier according to the exclusive-voice-communication-invitation request;
send the global identifier to the second server; and
receive the voice-room number returned by the second server, wherein the voice-room number is obtained by the second server by selecting from reserved free voice rooms according to the global identifier.

19. The apparatus according to claim 18, further including a second receiving unit configured to:

when logging in to the first server, receive the global identifier broadcasted by the first server, wherein the first server generates the global identifier when creating the fixed group.

20. The apparatus according to claim 19, further including an authorization application unit configured to:
apply for management-authorization information from the first server, wherein after the voice client enters the voice room automatically, the second server sets voice-room authorization according to the management-authorization information.

* * * * *